(12) United States Patent
Weinans et al.

(10) Patent No.: US 8,073,137 B2
(45) Date of Patent: Dec. 6, 2011

(54) AUDIO HEADSET

(75) Inventors: Erwin Weinans, Klijndijk (NL); Rene Hin, Emmen (NL); Barteld Trip, Emmen (NL)

(73) Assignee: Sony Ericsson Mobile Communications AB, Lund (SE)

( * ) Notice: Subject to any disclaimer, the term of this patent is extended or adjusted under 35 U.S.C. 154(b) by 1039 days.

(21) Appl. No.: 11/380,658

(22) Filed: Apr. 28, 2006

(65) Prior Publication Data

US 2007/0206829 A1 Sep. 6, 2007

Related U.S. Application Data

(60) Provisional application No. 60/767,132, filed on Mar. 6, 2006.

(51) Int. Cl.
*H04M 1/00* (2006.01)
(52) U.S. Cl. ............... 379/433.06; 381/370; 381/315; 455/575.2; 455/550.1
(58) Field of Classification Search ............... 379/387, 379/433.1–440; 381/370, 315; 455/575.2, 455/550.1
See application file for complete search history.

(56) References Cited

U.S. PATENT DOCUMENTS

| 7,369,532 | B2* | 5/2008 | Silvester | 370/349 |
| 2003/0133582 | A1* | 7/2003 | Niederdrank | 381/315 |
| 2004/0266404 | A1* | 12/2004 | Nasu et al. | 455/414.1 |
| 2005/0130697 | A1* | 6/2005 | Dyer | 455/550.1 |
| 2007/0004472 | A1* | 1/2007 | Gitzinger | 455/575.2 |

FOREIGN PATENT DOCUMENTS

| EP | 0 860 972 A2 | 8/1998 |
| EP | 0 946 028 A2 | 9/1999 |
| EP | 1 104 151 A2 | 5/2001 |
| EP | 1 394 666 A | 3/2004 |
| EP | 1 603 312 A | 12/2005 |
| RU | 44619 | 7/2005 |

* cited by examiner

*Primary Examiner* — Fan Tsang
*Assistant Examiner* — Ibraham Sharifzada
(74) *Attorney, Agent, or Firm* — Renner, Otto, Boisselle & Sklar, LLP

(57) ABSTRACT

An audio headset usable for conducting a voice call through a phone, and for playing audio, such as music, from a streaming audio device, by means of a speaker. The headset comprises a signal transceiver, wirelessly connectable to a plurality of devices, including a voice call device and an audio device. A control unit in the headset can be controlled by means of a switch, which is operable to selectively set the control unit to a single point connection setting, in which only audio signals received from a first device are relayed to the speaker, or to a multiple point connection setting, in which audio signals received from the first device or from a second device are relayed to the speaker. The first device is typically a mobile phone, and priority is preferably always given to voice call signals from mobile phone even in the multipoint connection setting.

16 Claims, 2 Drawing Sheets

AUDIO HEADSET

FIELD OF THE INVENTION

The present invention relates to an audio headset comprising one or more speakers, and a signal transceiver for wirelessly connecting the headset to a voice call device or to an audio device for receiving audio signals. As such, the headset is usable for controlling speech calls by connection to a voice call device, such as a mobile phone, and for playing music or other audio by connection to an audio source. Furthermore, the audio headset comprises a switch, which can be selectively set to one of two position, whereby the headset can be configured to be connected to only to the voice call device, or to both the voice call device and to one or more other device for receiving audio.

STATE OF THE ART

Systems and protocols for communication between electronic devices have been provided in many different forms throughout the years. In recent years, an attempt has been made to standardize a system for short range radio communication between electronic devices, under the name Bluetooth™. Bluetooth is basically a wireless personal area network technology, which is an open standard for short-range transmission of digital voice and data between predominantly mobile devices, such as laptops, Personal Digital Assistants PDA, and mobile phones, but also between mobile devices and stationary devices, and between stationary devices, such as printers, computers, fax machines and so on. Bluetooth supports point-to-point and multipoint applications. Bluetooth typically provides up to 720 Kbps data transfer within a range of 10 meters and up to 100 meters with a power boost. Bluetooth uses omni-directional radio waves that can transmit through walls and other non-metal barriers in the unlicensed 2.4 GHz band.

To use Bluetooth communication between two devices, the two devices need to first establish a trusted relationship. This is done through the Bluetooth pairing, sometimes referred to as bonding, process. During pairing, one and the same passkey is entered in both devices. For the example of using a wireless headset with a mobile phone, the user has first to pair the two device together to ensure that the GSM subscription is protected and to preserve the integrity of voice calls. Since Bluetooth normally has at least a 10 m range, the user needs to confirm that connections are to be established in order to ensure that it is the right devices that get connected. Some Bluetooth devices, like headsets, have no user interface so they use a fixed passkey. To simplify logistics, the value of this is sometimes the same in all samples, e.g. "0000" in all Sony Ericsson headsets.

In a typical procedure for pairing a headset with a mobile phone, the pairing process involves the steps of:
  making headset discoverable and pairable, e.g. by simply by powering on the headset;
  initiating a pairing procedure from the phone;
  selecting a headset to pair with from a list of such devices that were discovered as a result of starting the pairing procedure;
  entering a passkey that corresponds to the headset to pair with, e.g. a standard passkey for these types of devices.

Once paired, the headset and the mobile phone may connect in a Bluetooth session whenever they are within range of each other.

State of the art streaming headsets can connect to only one audio source at a time. In cases where there are several connectable sources within range, communication control becomes complicated and unpredictable for the user. At the same time, there is a market strive to provide the capability of having more than one audio device connected to a headset. Different audio devices may include a mobile phone, an IP phone, a PC, a music player, a PDA (Personal Digital Assistant), a television set, or other audio device. The object of having plural connectable devices provides a problem in terms of handling, though. A PC at work is not likely to interfere with a home PC, whereas e.g. a music player and a television set at home may simultaneously be in range. Furthermore, the mobile phone will most likely always be in range, and may also include a separate audio player and even a radio receiver for receiving broadcast FM radio channels.

SUMMARY OF THE INVENTION

A general object of the invention is to simplify the management of an audio headset which is connectable to two or more audio sources. More specifically, it is an object to provide a headset which is configured to handle voice call by wireless connection to a phone, and also to receive streaming audio, such as music, from a streaming audio source.

According to the invention, this object is fulfilled by an audio headset, comprising
a signal transceiver, wirelessly connectable to a plurality of devices, including a voice call device and an audio device;
a speaker;
a control unit, configured to relay audio signals to the speaker;
a switch operable to selectively set the control unit to
  a single point connection setting, in which only audio signals received from a first device are relayed to the speaker, or
  a multiple point connection setting, in which audio signals received from the first device or from a second device are relayed to the speaker.

In one embodiment, the audio headset comprises
a memory configured to store identities of the connectable devices.

In one embodiment, the control unit is configured to relay audio signals from the second device, being any one of the plurality of devices, in the multiple point connection setting.

In one embodiment, the control unit is configured to select, among the plurality of devices, a last used device as the second device in the multiple point connection setting.

In one embodiment, the control unit is configured to select, among the plurality of devices, a device which connects to the headset as the second device in the multiple point connection setting.

In one embodiment, the control unit is configured to give priority to audio signals from the first device over the second device in the multiple point connection setting.

In one embodiment, the first device is a voice call device.

In one embodiment, the first device is a phone.

In one embodiment, the first device is a voice call device and also includes an audio device.

In one embodiment, the signal transceiver is a bluetooth device, and wherein the plurality of devices are made connectable to the signal transceiver by pairing.

In one embodiment, the plurality of devices are different streaming audio devices.

In one embodiment, the switch is manually operable.

In one embodiment, the switch is manually operated by a slide key, selectively displaceable to a first or a second position.

In one embodiment, the audio headset comprises
a microphone for input of speech signals.

In one embodiment, the audio headset comprises
a pair of stereo speakers.

In one embodiment, the audio headset comprises
a carrier device for wearing the speaker positioned at a user's ear.

In one embodiment, the audio headset comprises
a support structure carrying the switch and the transceiver device, and
a carrier device for wearing the support structure as a necklace.

In one embodiment, the audio headset comprises
a support structure carrying the switch and the transceiver device, and
a cable connecting the speaker to the support structure.

In one embodiment, the audio headset comprises
a pair of stereo speakers,
a support structure carrying the switch and the transceiver device, and
a cable connecting the speakers to the support structure.

In one embodiment, the audio headset comprises
a pair of stereo speakers,
a support structure carrying the switch, the transceiver device, and one of the speakers, and
a cable connecting the other speaker to the support structure.

In one embodiment, the audio headset comprises
an audio control interface for input of audio control commands, wherein the signal transceiver is configured to send remote control commands based on input audio control commands to a device from which audio signals are presently received.

In one embodiment, the audio headset comprises
a voice call interface for input of a voice call command, wherein the signal transceiver is configured to send remote control commands based on input voice call control commands to the first device.

BRIEF DESCRIPTION OF THE DRAWINGS

The invention will be described in detail below with reference to the accompanying drawings, in which.

DETAILED DESCRIPTION OF PREFERRED EMBODIMENTS

The present description relates to the field of audio headsets which are usable both as a voice call tool and for playing music or other audio. The invention will be described herein as a Bluetooth headset as a best mode known to date, but it should be noted that other communication protocols and systems could be employed for communicating between the headset and the connected audio devices. The invention is based on the principle that the headset may be connected to two or more devices at the same time, which as such is possible also within other types of communication systems, such as in a WLAN. Furthermore, it should be emphasized that the term comprising or comprises, when used in this description and in the appended claims to indicate included features, elements or steps, is in no way to be interpreted as excluding the presence of other features elements or steps than those expressly stated.

Examples of embodiments will now be described with references made to the accompanying drawing. The headset according to the invention will mainly be described with reference to a first connectable device in the form of a mobile telephone, and a second connectable device in the form of an auxiliary streaming audio source. The headset and the connectable devices are preferably provided with means for communicating by radio, preferably Bluetooth, but devices may also be connected to the headset by cable.

Figure 1:
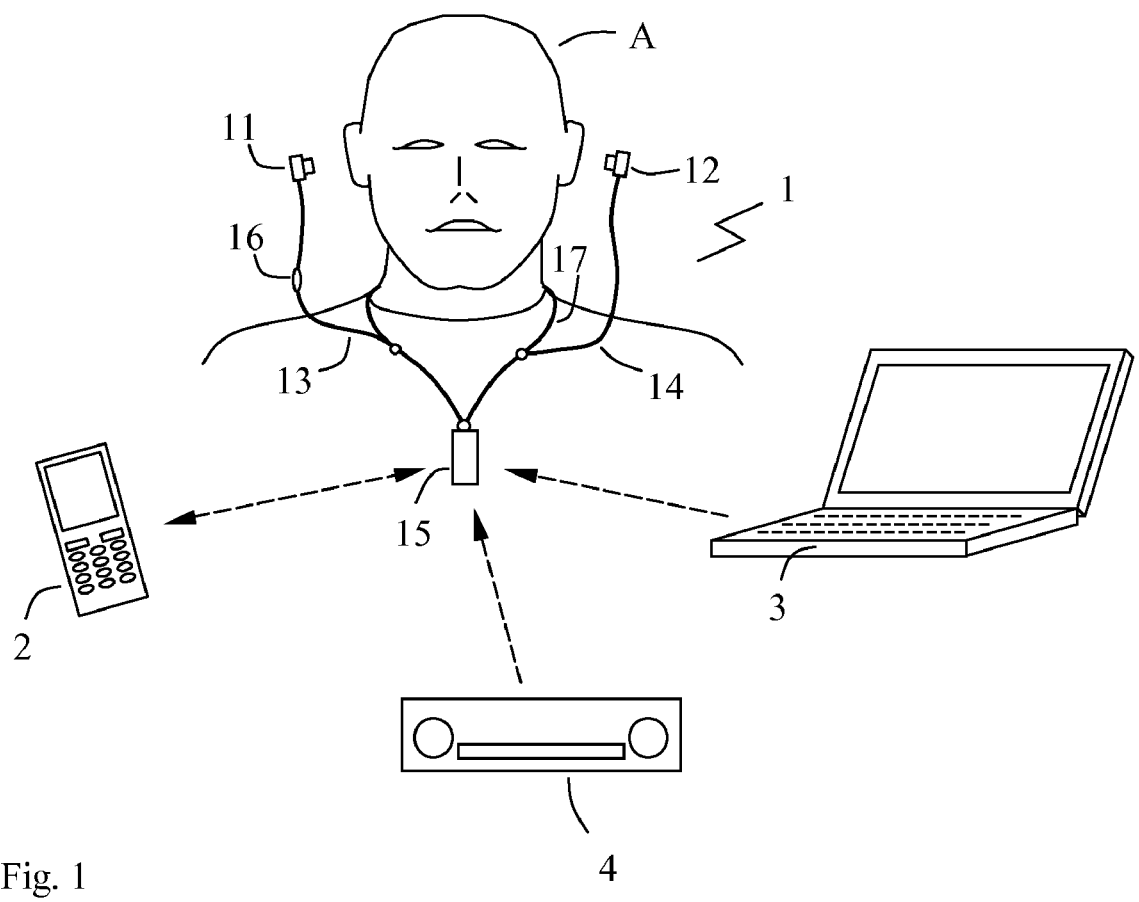
FIG. 1 schematically illustrates a user carrying an audio headset according to a first embodiment of the invention.

FIG. 1 illustrates a user A wearing a headset 1 according to a first embodiment of the invention. Headset 1 comprises two speakers 11 and 12, configured to provide stereo sound. Speakers 11 and 12 are plug-type speakers shaped to fit in the outer ear of a human, and are connected by respective cables 13 and 14 to a support structure 15. Cable 13 also carries a microphone 16, for use during voice calls. Support structure 15 is designed to be worn by the user, in the illustrated case by means of a necklace 17 interconnected with cables 13 and 14. Support structure 15 carries a signal transceiver operable to connect to two or more devices for receiving audio signals to be relayed to speakers 11 and 12. FIG. 1 further schematically illustrates a scenario where the signal transceiver of headset 1 is communicatively connectable to a mobile phone 2 for making voice calls and possibly receiving audio from an audio device in the phone, and to a computer 3 and a car stereo 4 for receiving audio signals, preferably by means of a Bluetooth connection.

Figure 2:
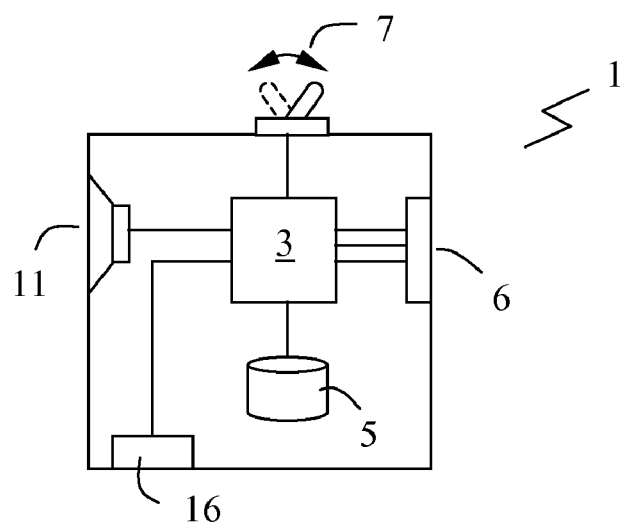
FIG. 2 schematically illustrates a block diagram of some of the functional elements of a headset according to an embodiment of the invention.

The basic functions of a headset according to an embodiment of the invention will now be described by means of the block diagram of FIG. 2. In one embodiment, headset 1 comprises a signal transceiver 6 including a receiver and a transmitter for wireless signal communication, preferably a Bluetooth chip. Signal transceiver is communicatively connected to a speaker 11, and to a microphone 16 for the purpose of making voice calls and giving voice commands. Block 3 represents a control unit, configured to relay audio signals to speaker 16 for generation of sound based on signals received in signal transceiver 6, and to relay input sound signals from microphone 16 to signal transceiver 6. Plural connections are drawn between signal transceiver 6 and control unit 3 to indicate that several devices may be connected to the headset, whereas audio signals from only one connected device is relayed at a time to speaker 11. Control unit 3 typically includes a microprocessor with associated software, programmed and configured to carry out the tasks of sound reproduction and management of connection setup and maintenance with connectable devices through transceiver 6. A power supply source is preferably also included, such as a battery (not shown). Headset 1 is further devised with a switch 7, operable to selectively set control unit 3 to one of two or more settings. In accordance with an embodiment of the invention, switch 7 is operable between two settings:

1) A single point connection setting. In this position, control unit 3 is configured only to relay audio signals received from a first device to speaker 11. This first device is therefore a first prioritized device, preferably a voice call device such as mobile phone 2. In the single point connection setting, no attempts are made by headset 1 to connect to any other devices, nor are attempted connections from other devices responded to. Headset 1 is thereby confined to be used with first device 2. In a preferred embodiment, first device 2 associated with the single point connection setting may not only comprise a voice call device, but may additionally also comprise an audio device, such as an mp3 player or an FM radio receiver. When the voice call function of the first device 2 is not used, i.e. when a call is not conducted or initiated, streaming audio from the audio device in phone 2 may be received in headset 1 and output by speaker 3.

2) A multipoint connection setting. In this position, signal transceiver 6 is allowed to connect to other devices than the first device 2. Signal transceiver 6 may therefore be connected to first device 2 and a second device 3 or 4, or both 3 and 4, or even only to one or more second devices 3 or 4. If first device 2 is connected, which would typically be the case if it is turned on and within range, it will always have priority over a connected second device, in that audio signals from the second device will be muted or stopped if a voice call is initiated through first device 2. In the multipoint connection setting, it is possible for a user to receive audio signals from a source other than the first device 2, such as from a streaming radio device, a television set, a car stereo or a PC with a streaming audio transmitter, while still being connected to phone 2 such that phone calls can be received or initiated on a first priority level.

One advantage obtained by means of the possibility to select one of two modes, is that it is possible to make use of the same headset 1 for receiving audio signals from a plurality of different sources, while still giving first priority to a first device 2, which is a voice call device. By defining one first device as first prioritized device, it will always be capable of breaking in to interrupt audio signals from any other device connected to the headset 1. Another advantage is that in the single point setting the headset can run longer in standby mode, since no connections to other devices are established or maintained, which saves power.

In a preferred embodiment, configuration of which device to be the first prioritized device is done by selecting the first paired device, in a Bluetooth embodiment. When the headset is purchased, the switch 7 is set in the single point connection position. The headset 1 is then turned on while being held in proximity to the device to be configured as the first device, such as phone 2. The pairing procedure is then controlled by means of the interface of phone 2, after which device 2 is automatically stored in a memory 5 as the first prioritized device. If the configuration of first prioritized device is to be changed, e.g. to a new phone, pairing may be re-initiated from the headset 1 by e.g. holding down a power on button on the headset for a preset number of seconds. When headset 1 is switched to the multipoint connection setting, other devices may also pair with headset 1. Identities for any paired device are preferably also stored in memory 5, and all devices which are paired to headset 1 are thereby made connectable to headset 1.

Figure 3:
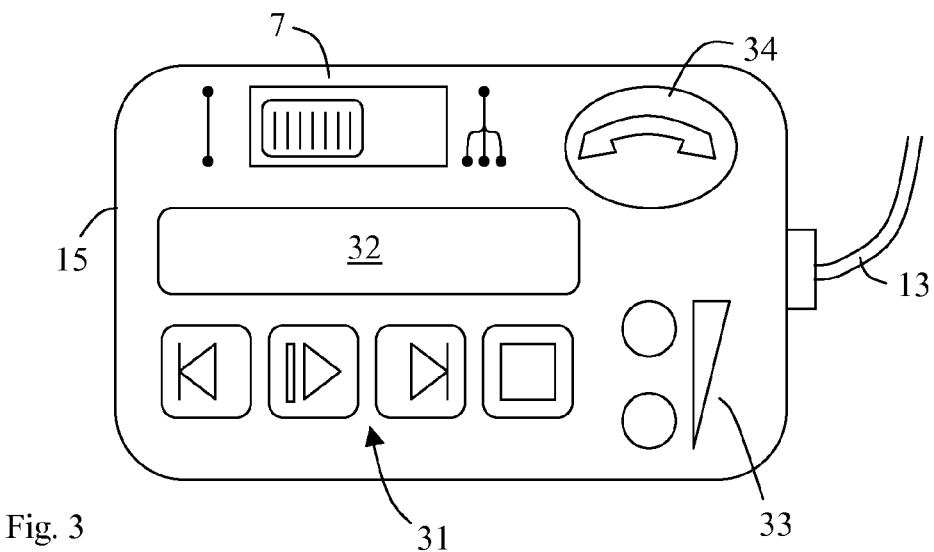
FIG. 3 schematically illustrates a support structure comprised in a headset according to an embodiment of the invention, carrying a user interface.

FIG. 3 schematically illustrates a part of a headset devised in accordance with an embodiment of the invention, showing a support structure 15 in the form of a housing, carrying at least some of the components of the headset 1. One or two speakers (not shown) are connected to support structure 15 by means of a cable 13. Switch 7 is carried on support structure 15 as a manually operable switch, selectively positioned in one of two possible settings. FIG. 3 illustrates an embodiment where switch 7 is operable by means of a slide key, displaceable between the single point setting indicated to the left, and the multipoint connection indicated to the right. An advantage with such a slide key is that it is easy for the user to see which setting the headset is in, without requiring output on a display. Furthermore, the slide key has a low profile which makes the headset compact. As an alternative solution, the switch may be operated by means of commands transmitted from the first priority device. Such an embodiment is more cumbersome to operate, but means fewer movable parts and therefore a potentially less expensive and more compact solution.

In one embodiment, support structure 15 also carries an interface 31 for controlling an audio device, typically including buttons for start/pause, stop, previous and next. Commands input by a user by means of interface 31 will be relayed by the signal transceiver 6 to the currently connected audio device. Interface 31 of headset 1 thereby acts as a remote control to the connected audio device. A display 32 may also be included in the interface 31, for providing information on audio pieces played, or call control information during voice calls. A volume control interface 33 is also included, which is operable to control the sound level sent to the speaker(s), preferably both during voice calls and during audio playing. In order to initiate and terminate voice calls, a voice call interface 34 is included. Preferably, voice call interface 34 comprises a single button, which may be pressed to answer an incoming call, to terminate an ongoing call, or to initiate input of voice commands for controlling the first prioritized device. Also voice call interface 34 is therefore a remote control interface.

Besides always selecting the first device with highest priority, a further priority mechanism is preferably included in headset 1, managed by control unit 3. In one embodiment, first device 2 includes an audio device. Even if the headset is then set to the multipoint connection mode by means of switch 7, and there are other connectable audio devices in range, control unit 3 is configured to connect to the audio device of first device 2. Audio control interface 31 is thereby configured to act as a remote control for the connected audio player of the first device 2. However, if active connection is initiated from another connectable device, such as laptop 3, priority will be given to device 3 over the audio player of first device 2. Audio control interface 31 is thereby configured to act as a remote control for the connected audio player of the second device 3, while voice call signals from fist device 2 will still have first priority. Active connection setup from another device may be achieved by using a specific interface on the second device, or connection setup may simply be configured to be initiated upon powering on the second device, such as turning on or pressing a play button on a second device in the form of a television set, an FM receiver, a laptop, an mp3 player and so on. In one embodiment a last used second device, i.e. the last second device being connected to headset 1, will be selected for connection again when the headset 1 is placed in multipoint mode, after being turned off or having been placed in single point mode.

Figures 4, 5:
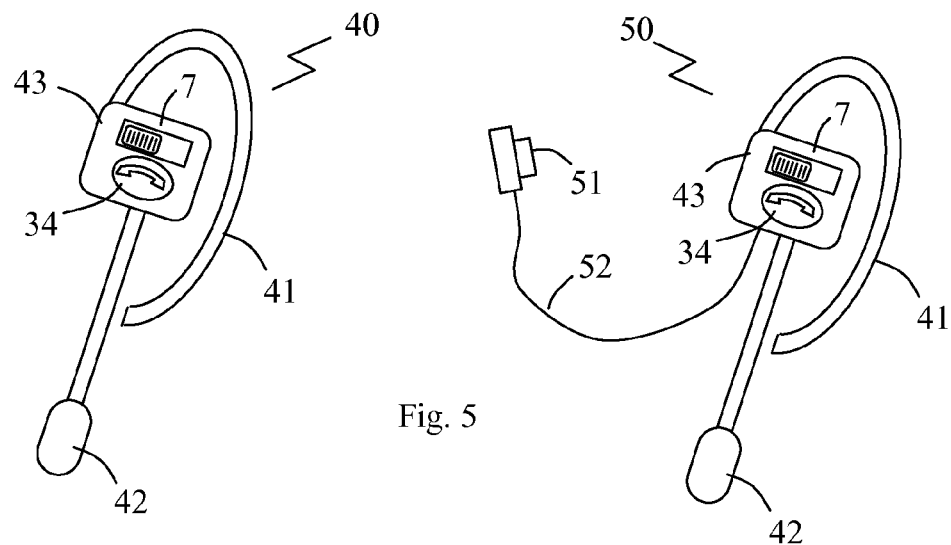
FIGS. 4-6 schematically illustrates alternative embodiments to the embodiment of FIG. 1.
Figure 6:
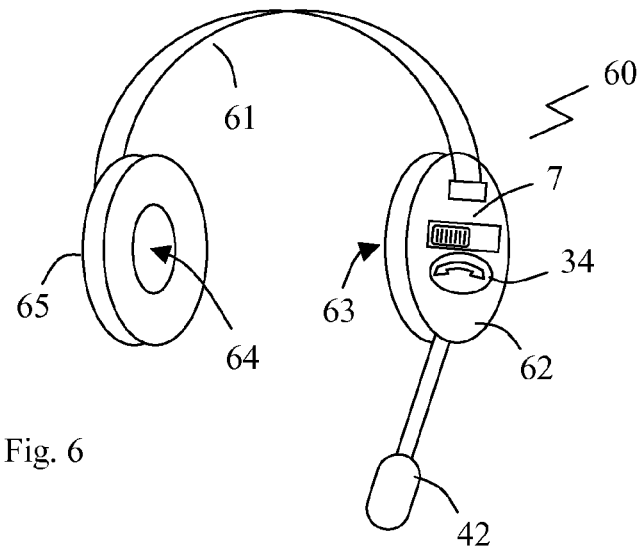

In order to show examples of alternative embodiment, brief reference is now made to FIGS. 4 to 6.

FIG. 4 illustrates a single speaker headset 40, comprising a carrier device 41 for wearing the headset such that the speaker is positioned at a user's ear. Headset 40 also includes a microphone 42 for use during voice calls. A support structure 43 carries the speaker, the carrier device 41 and microphone 42, so as to form an integral unit 40. The speaker is typically positioned on the reverse side of carrier device 43, and is therefore not shown. Furthermore, selected parts of the elements shown on support structure 15 in FIG. 3 may be carried on support structure 43, including voice call interface 34, as well as manually operable switch 7 for setting the headset 40 in single point connection mode or multipoint connection mode, provided on support structure 43. Also the other components described with reference to FIG. 2 are included in support structure 15, including signal transceiver 6 and control unit 3.

FIG. 5 illustrates a stereo speaker embodiment of a headset 50, which can be considered a combination of the embodiments of FIGS. 1 and 4. As such, headset 50 comprises the features of headset 40, and the corresponding reference numerals are therefore used. Furthermore, a second speaker 51 is connected to support structure 43 by means of a cable 52. This brings about a lightweight stereo headset which also has the other benefits of the present invention.

FIG. 6 is yet another alternative stereo embodiment of a headset 60, comprising a carrier device 61 adapted to be used over or around the user's head, interconnecting a support structure 62 carrying first speaker 63 in a pad arranged on the support structure, and a second speaker 64 held in a pad 65. Further features include microphone 42, switch 7 and voice call interface 34. Padded speakers as suggested in this embodiment generally provide improved sound quality by an improved capability to shut out other sound sources in the environment, and carrier structure 61 is often preferred by users who wear the headset for long time periods.

The foregoing has described the principles, preferred embodiments and modes of operation of the present invention. However, the invention should be regarded as illustrative rather than restrictive, and not as being limited to the particular embodiments discussed above. It should therefore be appreciated that variations may be made in the disclosed embodiments by persons skilled in the art without departing from the scope of the present invention as defined by the following claims.

We claim:

1. An audio headset, comprising
a signal transceiver for wireless signal communication with a plurality of devices that are each operatively connectable over corresponding wireless connections, the plurality of devices including at least a first device that has a voice call function and other devices that each have an audio device function, and the first device having higher priority than the other devices;
a speaker;
a microphone for input of speech signals;
a control unit, configured to relay audio signals from only one connected device at a time to the speaker based on audio signals received over the signal transceiver; and
a switch operable to selectively set the control unit between two settings, including:
a single point connection setting, in which the headset is confined to wireless connection with the first device and only audio signals received from the first device are relayed to the speaker and in which signals from the microphone are transmitted to the first device, and
a multiple point connection setting, in which the signal transceiver is allowed to connect with the first device and the other devices, and audio signals received from one of the first device or one of the other devices are relayed to the speaker automatically according to relative predetermined priority of the devices from which the audio signals are received so that during a voice call involving the first device only audio signals received from the first device are relayed to the speaker and signals from the microphone are transmitted to the first device;
a memory configured to store identities of the plurality of devices as determined by pairing of each device with the audio headset and to store the predetermined priority of the devices, the priority of the first device determined by the order of the pairing of the devices with the audio headset and changeable by re-initiating the pairings.

2. The audio headset of claim 1, wherein the control unit is configured to select, among the other devices, a last used device as the second highest priority device in the multiple point connection setting.

3. The audio headset of claim 1, wherein the first device is a phone.

4. The audio headset of claim 1, wherein the first device also includes an audio device function.

5. The audio headset of claim 1, wherein the signal transceiver is a Bluetooth device.

6. The audio headset of claim 1, wherein the plurality of devices are different streaming audio devices.

7. The audio headset of claim 1, wherein the switch is manually operable.

8. The audio headset of claim 1, wherein the switch is manually operated by a slide key, selectively displaceable to a first or a second position.

9. The audio headset of claim 1, comprising
a pair of stereo speakers.

10. The audio headset of claim 1, comprising
a carrier device for wearing the speaker positioned at a user's ear.

11. The audio headset of claim 1, comprising
a support structure carrying the switch and the transceiver device, and
a carrier device for wearing the support structure as a necklace.

12. The audio headset of claim 1, comprising
a support structure carrying the switch and the transceiver device, and
a cable connecting the speaker to the support structure.

13. The audio headset of claim 1, comprising
a pair of stereo speakers,
a support structure carrying the switch and the transceiver device, and
a cable connecting the speakers to the support structure.

14. The audio headset of claim 1, comprising
a pair of stereo speakers,
a support structure carrying the switch, the transceiver device, and one of the speakers, and
a cable connecting the other speaker to the support structure.

15. The audio headset of claim 1, comprising
an audio control interface for input of audio control commands, wherein the signal transceiver is configured to send remote control commands based on input audio control commands to a device from which audio signals are presently received.

16. The audio headset of claim 1, comprising
a voice call interface for input of a voice call command, wherein the signal transceiver is configured to send remote control commands based on input voice call control commands to the first device.

* * * * *